Feb. 27, 1934.  F. O. HOAGLAND  1,948,617
TRACER CONTROLLED LATHE
Filed Aug. 12, 1932  2 Sheets-Sheet 1
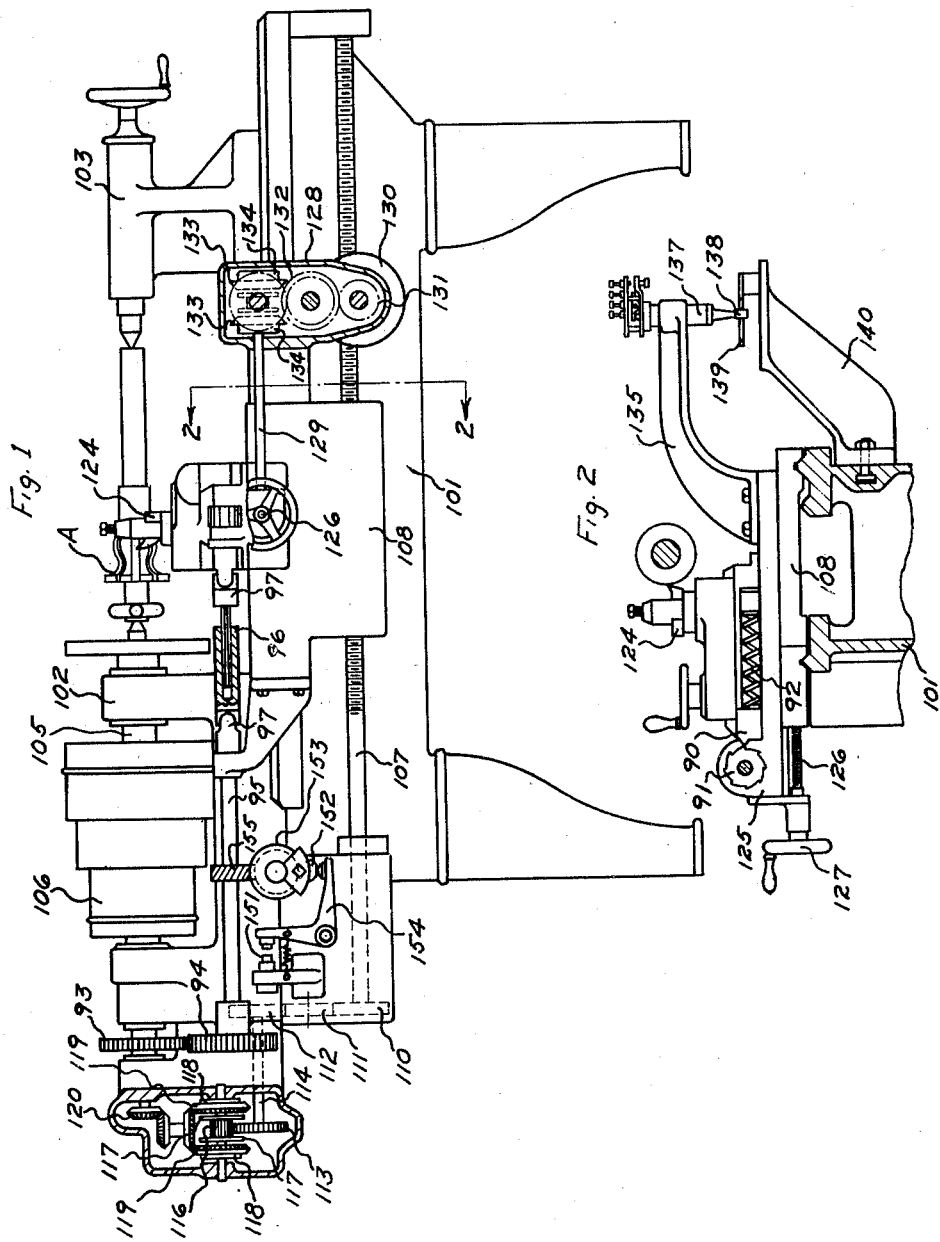
INVENTOR
F. O. Hoagland
BY
Joseph K. Schofield
ATTORNEY

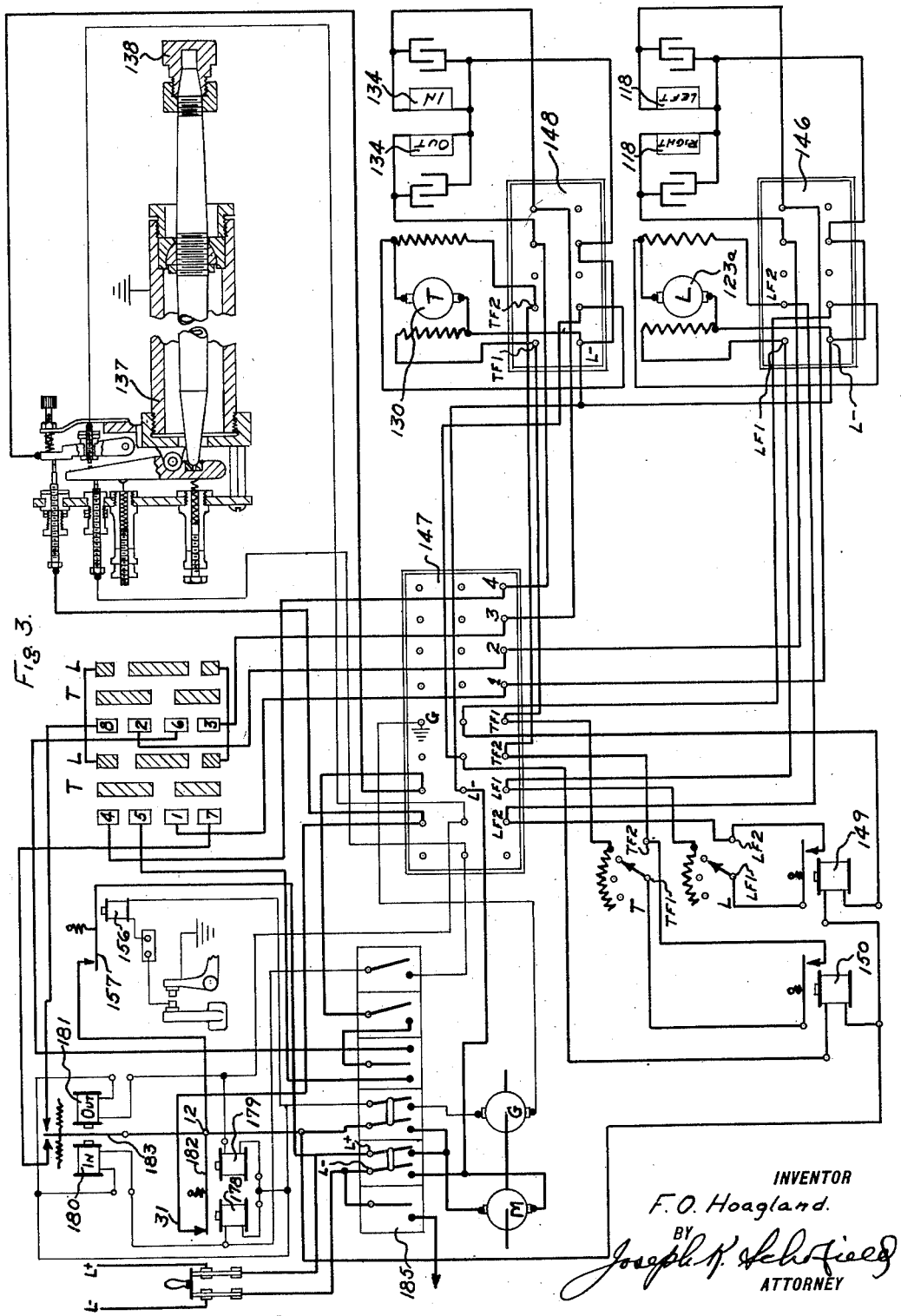

Patented Feb. 27, 1934

1,948,617

UNITED STATES PATENT OFFICE 1,948,617

TRACER CONTROLLED LATHE

Frank O. Hoagland, West Hartford, Conn., assignor to Pratt & Whitney Company, Hartford, Conn., a corporation of New Jersey Application August 12, 1932. Serial No. 628,574

8 Claims. (Cl. 82—14)

This invention relates to metal turning lathes and particularly to a lathe adapted to have the position of its cutting tool controlled by an electrically operated tracer in contact during operation with a template.

An object of the invention is to provide a lathe of the electric tracer type with improved mechanism rendering the operation of the lathe smoother, more accurate and uniform in its operation.

More particularly it is an object of the present invention to improve the lathe shown and described in Shaw et al. Patent No. 1,772,431 granted August 5, 1930.

In operating a lathe in which the work is constantly rotated and the tool periodically positioned by a sensitive tracer contacting with a template an edge of which has the outline of the form being reproduced, it is necessary to operate the positioning device once only during each rotation of the work. With each rotation of the work the tool may be either advanced longitudinally in either direction or moved inward or outward relative to the axis of rotation of the work. In operations involving interrupted cutting actions exemplified in the embodiment illustrated herewith as a relieving action, the tool is alternately cutting and idling between successive teeth or other projections of the work being turned. It is therefore an object of the present invention to so time the operation of the tracer controlled feed positioning device for the tool that the repositioning movement will take place between successive cutting operations, that is, while the tool is not actually engaged in cutting. In this manner it is possible to effect the tool positioning movement when the parts are not stressed by the cutting action of the cutting tool and movements can be effected with minimum power and with slight and uniform resistance to the movement of the members supporting the tool.

With these and other objects in view my invention includes the features of construction and operation set forth in the following specification and illustrated in the accompanying drawings.

In the accompanying drawings annexed hereto and forming a part of this specification, I have shown my invention embodied in a lathe similar to that shown in the above mentioned patent but it will be understood that the invention can be otherwise embodied and that the drawings are not to be construed as defining or limiting the scope of the invention, the claims appended to this specification being relied upon for that purpose.

In the drawings:

Figure 1 is a front elevation of a complete lathe provided with the present improvements.

Fig. 2 is a transverse sectional view taken substantially upon the line 2—2, and looking in the direction of the arrows, shown in Fig. 1, and Fig. 3 is a diagram showing the circuits for operating the tool positioning mechanism.

In the above mentioned drawings I have shown but one embodiment of the invention which is now deemed preferable but it is to be understood that changes and modifications may be made within the scope of the appended claims without departing from the spirit of the invention.

Briefly and in its preferred form, my invention may include the following principal parts: First, a base having work supporting and rotating means, a tool carriage movable longitudinally with respect to the axis of the work, a transversely movable slide on the carriage and a relieving slide on which the lathe tool may be mounted adapted to be reciprocated upon the transversely movable slide. A template mounted on the base having an outline similar to that desired to be reproduced and a tracer carried by the transversely movable slide adapted to be electrically controlled, and a switch adapted to be opened and closed in timed relation to the rotation of the spindle, this switch in turn controlling the opening and closing of a circuit in the electric system for the tool control to render the tool positioning mechanism alternately operative or inoperative, the operative period occurring during a small portion of each rotation of the work supporting and rotating spindle.

Referring more in detail to the figures of the drawings, it will be seen that the lathe illustrated comprises the usual bed or base 101, headstock 102, and tailstock 103, work A being usually mounted between centers in these members. The headstock spindle 105 of the lathe may be continuously rotated during operation in any suitable manner, as by pulleys 106 thereon as shown, through suitable belting from a motor indicated at 123ª in the diagram. The lathe is provided with a lead screw 107 for feeding a tool carriage 108 longitudinally along the base 101, the lead screw 107 being rotated through magnetic clutches in the same manner as in the above mentioned patent. Accordingly the motor 123ª is geared through suitable intermediate gears 110, 111 and 112 to a gear 113 on shaft 114.

Gear 113 meshes with a pinion 116 secured to clutch armatures 117 adapted to cooperate respectively with two clutch magnets 118 provided with opposed bevel gears 119 driven by meshing bevel gear 120. Pinion 120 is connected with shaft 123 forming an extension of spindle 105 so that these clutch magnets rotate with and in timed relation to this spindle 105. Through the above connections and driving means the lead screw 107 is rotated to advance the carriage 108 in either direction.

The lathe tool 124 is mounted on a reciprocatory slide 90 presently to be more fully described which in turn is mounted on a cross slide 125. Movement of this slide 125 is effected by a transverse feed screw 126 provided with the usual hand wheel 127. The cross slide 125 is mounted on carriage 108 for movement transversely thereof. For this purpose clutch gear mechanism and a driving motor 130 are mounted in a casing 128 secured to the carriage 105. The magnetic clutch drive is preferably effected through a shaft 129 geared to the cross feed screw 126 by suitable gearing. The motor 130 by suitable intermediate gears 131, 132 and 133 generally similar to those described for clutches 118 rotates magnetic clutches 134, the armature of which rotates shaft 129 in the same manner as described in connection with clutches 118 and lead screw 107. This controlling means for the cross feed slide 125 is mounted entirely on the carriage 108 and controls the transverse movements of the lathe tool with carriage 108 in any longitudinal position on the base 101.

On the rear extension of the cross slide 125 is an overhanging bracket 135 having a support for the electric tracer 137. This tracer is provided with a point 138 contacting with a template 139 suitably supported in fixed position upon the bed 101. The operation and construction of the tracer 137 is similar in every way to that shown in the above referred to patent.

In the present construction a relieving movement is provided for the tool 124, that is, a reciprocatory movement of the tool takes place in timed relation to the spindle 105 rotation. This is for the purpose of forming relieved or back-off portions such as milling cutter teeth. This transverse reciprocatory movement is effected by a rotating cam 91 engaging a portion of the reciprocatory slide 90, a spring 92 returning this slide 91 to its inoperative or outer position. To rotate the relieving cam 91 a gear 93 keyed to the spindle 105 meshes with and rotates a gear 94 on the end of a longitudinal shaft 95 extending to the carriage 108. A telescopic section 96 is provided in this shaft to accommodate the longitudinal movements of the carriage. Also universal joints 97 are provided in the shaft to permit transverse movements of the cross slide 125. By the above connections the cam 91 may be rotated in timed relation to the rotation of the work A. By proper selection of the gears 93 and 94 and number of projections on the cam 91 the tool 124 may be given any desired number of reciprocations during a single rotation of the spindle 105 and work A.

The diagram indicating the circuits controlling movements of the carriages 108 and 125 is similar to that shown in Fig. 5 of the above referred to patent. It is not thought necessary therefore to repeat the description of these circuits except insofar as may be necessary to point out the principal features thereof. The magnetic clutches 118 for longitudinal movement of the carriage 108 are indicated respectively by "right" and "left." The motor marked L and 123ª is shown for rotating these clutches 118 and also for rotating spindle 105 through a belt (not shown) on the cone pulley. Magnetic clutches 134 for operating the transverse or cross feed for the tool 124 are indicated as "Out" and "In." The motor 130 for rotating these clutches 134 is indicated at T.

A relatively high potential is used in the currents for energizing the magnetic clutches 118 and 134. The circuits for operating clutches 118 and motor L or 123ª are brought to a terminal board 146 and thence to terminal board 147. From the latter board circuits extend to the tracer 137. Similarly the wiring connections for the clutches 134 and motor 130 are brought to a board 148 and thence to board 147.

The tracer 137 employed is in every way similar to that employed in the above referred to application so that detail description thereof is not thought to be necessary. The tracer 137 through relay magnets 149, 150, 178, 179, 180 and 118 energized by the low potential circuits opened and closed by movements of the tracer 137 opens and closes circuits for energizing the clutches 118 and 134. The tool 124 is therefore traversed longitudinally and transversely of work A rotatably mounted on spindle 105 to reproduce the contour of the template 139.

It is obvious that with work in the form of surfaces of revolution but one movement of the tool 124 is required per revolution. Furthermore, with relieved work such as cutters having backed-off teeth the cutting action of the tool will be intermittent. Unless means are provided to operate the tool 124 in timed relation to this rotation the tool 124 may be moved by the clutches 118 and 134 either while the tool is cutting or between the interrupted cuts. The movement of the tool 124 under one condition may be very different from that under the other resulting in uneven or rough work. A special circuit is therefore provided which enables the clutches 118 and 134 to be energized during a portion only of the spindle rotation so that movement of the tool 124 may take place during idle portions. The positioning means are only energized to effect movement of the tool 124 momentarily during any one revolution of the spindle 105.

Adjacent any convenient member rotating with the spindle 105 or operated in timed relation therewith I provide a switch 151. This switch 151 may be opened and closed as by rotation of a projection 152 on a disk 153 engaging an arm of the member 154 mounting the movable member of the switch 151. The disk 153 as shown in Fig. 1 is rotated on a short shaft rotated by a gear 155 on the driving shaft 95 for the tool reciprocating cam 91. By selecting the proper gears for driving these shafts the switch 151 may be opened once during each rotation of spindle 105 and the work A. This switch 151 through a relay magnet 156 controls a switch 157 in the main circuit both for the longitudinal movement of the carriage 108 and transverse movement of the cross slide 125. With the switch 151 opened by the projection 152 the main switch 157 is closed by a suitable spring. With this main switch 157 closed the tracer 137 is operative to control movements of the tool 124 in the manner fully described in the above mentioned patent. As soon, however, as the switch 151 is in closed position the relay magnet 156 is energized so that main switch 157 is opened. This opens the circuits to the clutches 118 and 134 so that no movement of the clutches 118 and 134 can take place until the projection 152 again opens the switch. All movements of the tool 124 therefore take place during the small part of the rotation of the disk 153 during which the projection 152 holds switch 151 open. By positioning this projection 152 on the disk 153 the movement of the tool 124 through the clutches 118 and 134 can be made to take place during an inoperative portion of its cutting action as between the successive or interrupted operations on projections of the work A being relieved or otherwise operated on.

What I claim is:

1. A machine tool comprising in combination, a continuously rotating work spindle, a tool mounted for longitudinal and transverse movements relative to said spindle, a template following tracer adjacent said spindle for controlling the movements of said tool during rotation of said spindle, and means rendering said tracer inoperative to control movements of said tool during portions of the rotation of said spindle.

2. A machine tool comprising in combination, a continuously rotating work spindle, a tool mounted for longitudinal and transverse movements relative to said spindle, a template following tracer adjacent said spindle for controlling the movements of said tool during rotation of said spindle, and means operating in timed relation to the rotation of said spindle for rendering said tracer inoperative to control movements of said tool during portions of the rotation of said spindle.

3. A machine tool comprising in combination, a rotatably mounted work spindle, a tool mounted for longitudinal and transverse movements relative to said spindle, an electrically operating template following tracer adjacent said spindle for controlling the movements of said tool during rotation of said spindle, a switch in a circuit for said tracer, and means to open and close said switch during rotation of said spindle whereby said tracer may be alternately rendered operative and inoperative to control movements of said tool.

4. A machine tool comprising in combination, a rotatably mounted work spindle, a tool mounted for longitudinal and transverse movements relative to said spindle, means to reciprocate said tool a plurality of times during a revolution of said spindle, a template following tracer adjacent said spindle for controlling movements of said tool during rotation of said spindle, and means to render said tracer operative to effect movement of said tool during portions only of the rotation of said spindle.

5. A machine tool comprising in combination, a rotatably mounted work spindle, a tool mounted for longitudinal and transverse movements relative to said spindle, means to reciprocate said tool a plurality of times during a revolution of said spindle, a template following tracer adjacent said spindle for controlling the movements of said tool during rotation of said spindle, and means to render said tracer operative to effect transverse positioning movement of said tool during portions only of the reciprocatory movements of said tool.

6. A machine tool comprising in combination, a rotatably mounted work spindle, a tool mounted for longitudinal and transverse movements relative to said spindle, a template following tracer adjacent said spindle for controlling the movements of said tool during continuous rotation of said spindle, a member rotating in timed relation with said spindle, and means on said member rendering said tracer inoperative to control movements of said tool during portions of the rotation of said spindle.

7. A machine tool comprising in combination, a rotatably mounted work spindle, a tool mounted for longitudinal and transverse movements relative to said spindle, an electrically operating template following tracer for controlling movements of said tool during continuous rotation of said spindle, a member rotating in timed relation with said spindle, and means thereon for alternately opening and closing a switch for rendering said tracer alternately operative and inoperative to control movements of said tool during portions of the rotation of said spindle.

8. A machine tool comprising in combination, a base, a rotatably mounted work spindle, a carriage mounted for longitudinal movement on said base, a slide on said carriage mounted for transverse movements relative to said spindle, a tool mounted on said slide, a tracer mounted on said slide contacting with a template fixed to said base, said tracer and template controlling movements of said carriage and slide during continuous rotation of said spindle, a member rotating in timed relation with said spindle, and means thereon rendering said tracer inoperative to control movements of said carriage and slide during portions of the rotation of said spindle.

FRANK O. HOAGLAND.